(12) United States Patent
Chou et al.

(10) Patent No.: US 11,704,470 B2
(45) Date of Patent: *Jul. 18, 2023

(54) PRE-CHARACTERIZATION MIXED-SIGNAL DESIGN, PLACEMENT, AND ROUTING USING MACHINE LEARNING

(71) Applicant: Taiwan Semiconductor Manufacturing Company Limited, Hsinchu (TW)

(72) Inventors: Wen-Shen Chou, Hsinchu County (TW); Jie-Ren Huang, Hsinchu (TW); Yu-Tao Yang, Hsinchu County (TW); Yung-Chow Peng, Hsinchu (TW); Yung-Hsu Chuang, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 22 days.

This patent is subject to a terminal disclaimer.

(21) Appl. No.: 17/384,895

(22) Filed: Jul. 26, 2021

(65) Prior Publication Data

US 2021/0350063 A1    Nov. 11, 2021

Related U.S. Application Data

(63) Continuation of application No. 16/572,651, filed on Sep. 17, 2019, now Pat. No. 11,106,855.

(51) Int. Cl.
*G06F 7/50* (2006.01)
*G06F 30/398* (2020.01)
*G06N 20/00* (2019.01)
*G06F 30/20* (2020.01)
*G06F 111/04* (2020.01)

(52) U.S. Cl.
CPC ............ *G06F 30/398* (2020.01); *G06F 30/20* (2020.01); *G06N 20/00* (2019.01); *G06F 2111/04* (2020.01)

(58) Field of Classification Search
USPC .................. 716/110, 111, 118, 119, 120, 122
See application file for complete search history.

(56) References Cited

U.S. PATENT DOCUMENTS

| | | | |
|---|---|---|---|
| 6,892,366 B1 * | 5/2005 | Teig ...................... | G06F 30/367 716/115 |
| 6,907,591 B1 * | 6/2005 | Teig ...................... | G06F 30/367 716/136 |
| 7,051,293 B1 * | 5/2006 | Teig ...................... | G06F 30/398 716/113 |
| 10,235,601 B1 * | 3/2019 | Wrenninge .......... | G06K 9/6256 |
| 2017/0363950 A1 * | 12/2017 | Sriraman ................. | G03F 1/36 |
| 2018/0314148 A1 * | 11/2018 | Tetiker ..................... | G03F 1/70 |
| 2019/0325108 A1 * | 10/2019 | Turek ..................... | G06N 3/084 |

(Continued)

*Primary Examiner* — Brian Ngo
(74) *Attorney, Agent, or Firm* — Jones Day

(57) ABSTRACT

Systems, methods, and devices are disclosed herein for developing a cell design. Operations of a plurality of electrical cells are simulated to collect a plurality of electrical parameters. A machine learning model is trained using the plurality of electrical parameters. The trained machine learning model receives data having cell layout design constraints. The trained machine learning model determines a cell layout for the received data based on the plurality of electrical parameters. The cell layout is provided for further characterization of electrical performance within the cell layout design constraints.

20 Claims, 12 Drawing Sheets

(56) References Cited

U.S. PATENT DOCUMENTS

2020/0050736 A1* 2/2020 Shayani .................. G06F 30/27
2020/0104457 A1* 4/2020 Chuang ................. G06F 30/327
2020/0372365 A1* 11/2020 Cecil ...................... G06N 20/00

* cited by examiner

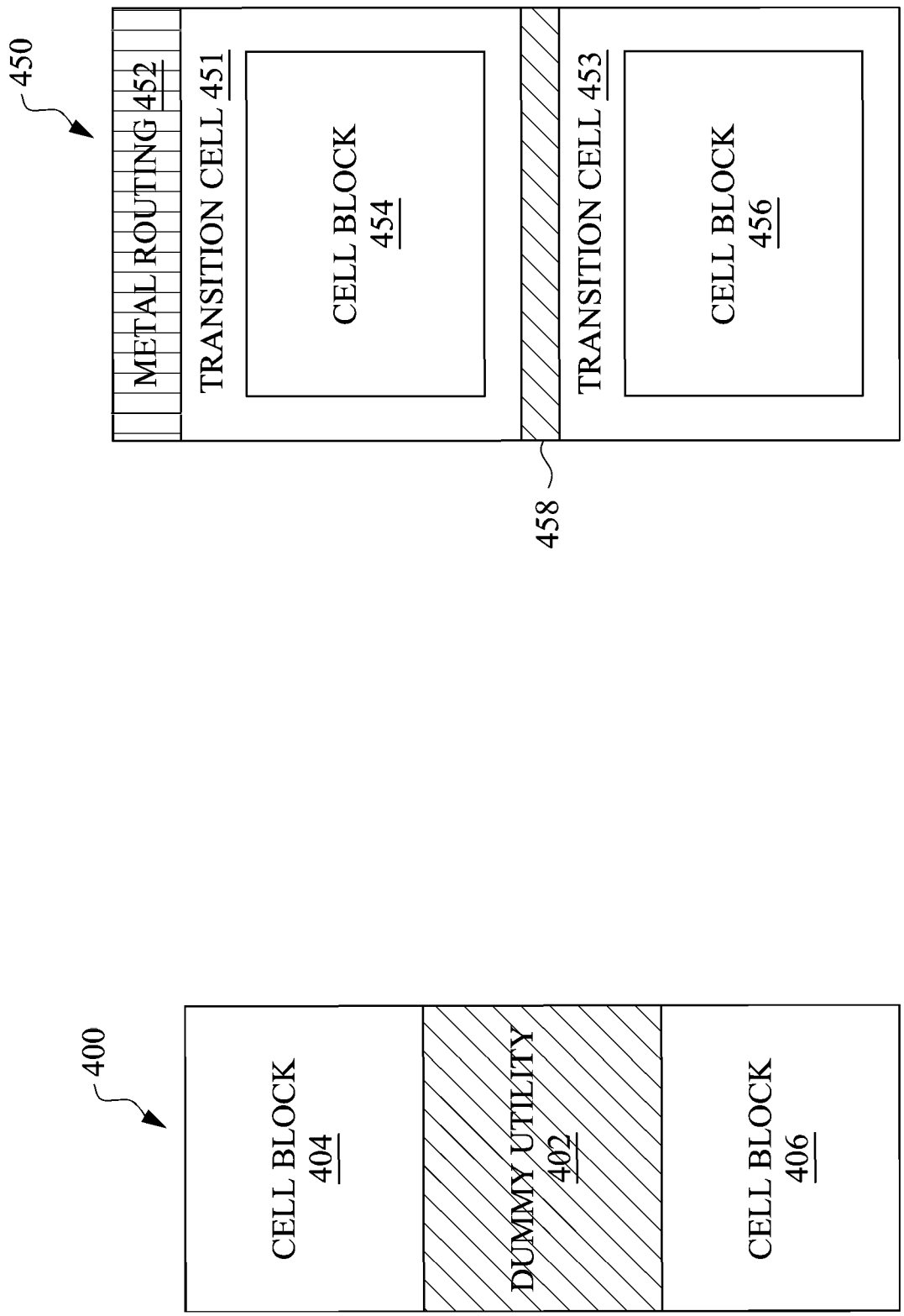

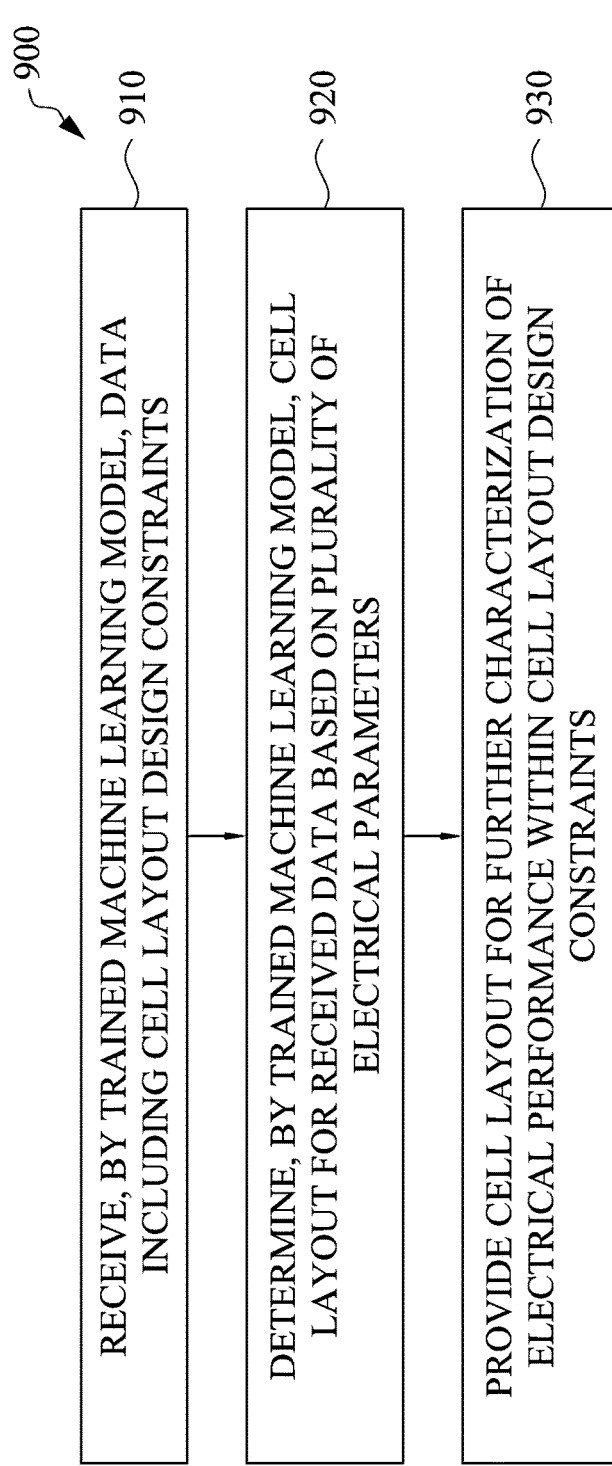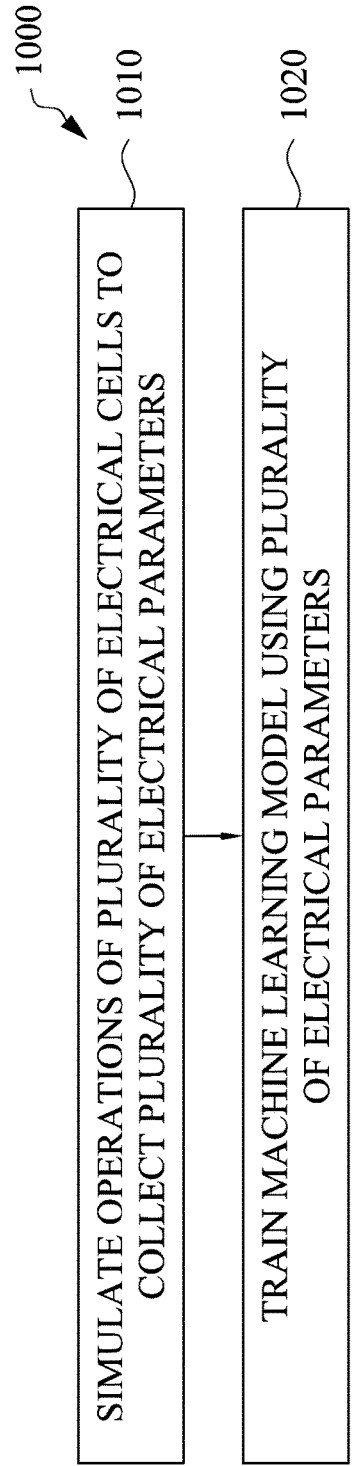
FIG. 9
FIG. 10

PRE-CHARACTERIZATION MIXED-SIGNAL DESIGN, PLACEMENT, AND ROUTING USING MACHINE LEARNING

CROSS-REFERENCE TO RELATED APPLICATIONS

This application is a continuation application of U.S. patent application Ser. No. 16/572,651, filed Sep. 17, 2019, which is incorporated herein by reference in its entirety.

FIELD

The technology described in this disclosure relates generally to electronic devices and more particularly to the use of machine learning to design layouts for electronic devices.

BACKGROUND

Conventional analog circuit design such as analog mixed signal (AMS) design typically requires manually drafted electrical schematics and/or cell layouts. Placement and routing of electrical components and signals within an analog cell layout can be a time-consuming process. When performed manually, AMS designing can depend upon a particular designer's experience. Following manual design, post-layout simulation is then used to determine the robustness of the design. In order to achieve an optimal mixed-signal performance, the AMS design can be reviewed and re-worked a number of times. Such optimization can require numerous design iterations resulting in a time-consuming and/or high cost process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A illustrates an exemplary cell layout having a vertical abutment between cell blocks and a dummy utility in accordance with various embodiments of the present disclosure.

FIG. 4B illustrates an example cell layout generated using machine learning component(s) in accordance with various embodiments of the present disclosure.

FIG. 9 is a flow chart of an exemplary method of generating analog cell layouts using machine learning components in accordance with various embodiments of the present disclosure.

FIG. 10 is a flow chart of an exemplary method of training a machine learning model to generate analog cell layouts in accordance with various embodiments of the present disclosure.

DETAILED DESCRIPTION

Figure 1:
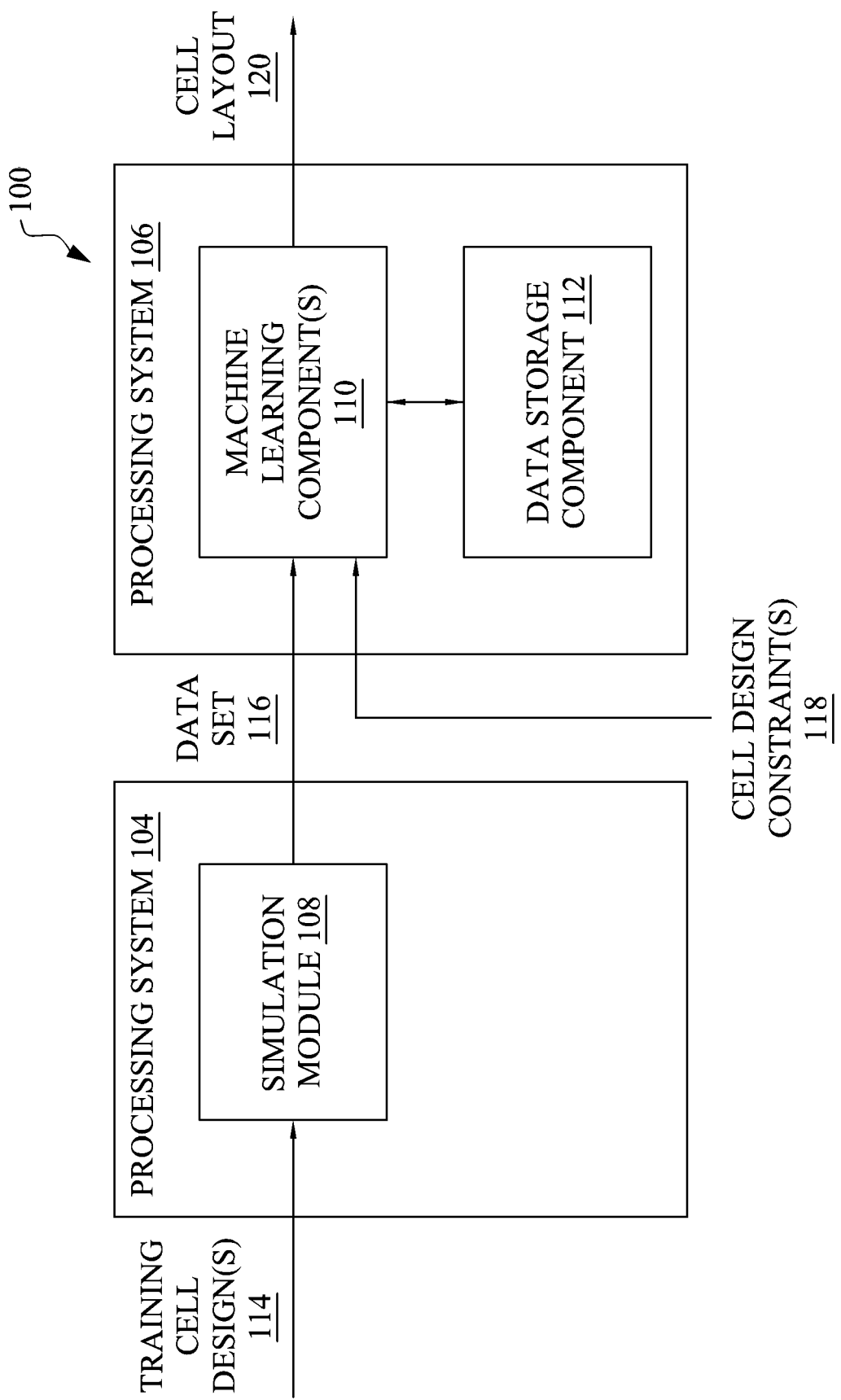
FIG. 1 illustrates an example of a system that processes a dataset in order to generate an electrical layout of an analog cell in accordance with various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Artificial intelligence is the ability of a computing device to analyze collected data and reach conclusions and/or make decisions using such data. Machine learning is a common method of creating artificial intelligence. With machine learning, a computing device obtains and applies its knowledge to make decisions without being explicitly programmed by a series of rules. For example, machine learning component(s) can be trained using large datasets and generate an output based on that dataset. In connection with the present disclosure, a large dataset is generated from simulated operations of input cell designs. Key parameters are extracted from those simulations and provided to machine learning component(s) for training. The trained machine learning component(s) can then use cell design constraints of a desired cell layout to generate a layout that complies with such constraints.

FIG. 1 illustrates an example system 100 that generates and processes a dataset 116 in order to generate a cell layout 120 of one or more electrical cells in accordance with various embodiments of the present disclosure. The system 100 includes one or more processing systems 104, 106.

Processing system 104 includes a simulation module 108. Simulation module 108 receives training cell design(s) 114 (e.g., analog or digital cell designs). The training cell design(s) 114 may be received by the processing system 104 via a communications network, e.g., an Internet, an intranet, an extranet, a local area network ("LAN"), a wide area network ("WAN"), a metropolitan area network ("MAN"), a virtual local area network ("VLAN"), and/or any other network. The training cell design(s) 114 may also be received via a wireless, a wired, and/or any other type of connection.

Simulation module 108 can include processing capability for simulating operation of input cell designs (e.g., training cell design(s) 114) which includes performance metrics of each cell design (e.g., voltage and/or current characteristics). Simulation module 108 can execute simultaneous simulations on (i) a number of training cell design(s) 114 under the same operational conditions or (ii) a single training cell design 114 under a number of different operational conditions. Simulation module 108 can also execute simulations serially (e.g., at two different points in time) using the same training cell design 114 under differing operational conditions. Alternatively, simulation module 108 can execute simulations serially (e.g., at two different points in time) using the same operational conditions for a number of different training cell design(s) 114. Simulation module 108 can also, simultaneously or serially, simulate operations of a number of different training cell design(s) 114 under a number of different operational conditions. Key electrical parameters are extracted from the simulation module 108 to generate a dataset 116. Dataset 116 is provided to machine learning component(s) 110 of processing system 106 for training. For example, dataset 116 can be a lookup table that includes any combination of electrical parameters such as a threshold voltage ($V_t$), a drive current ($I_d$), transconductance ($g_m$), output resistance ($r_{out}$), gate-source parasitic capacitance ($C_{gs}$), gate-drain parasitic capacitance ($C_{gd}$), stackgate number, mismatch, noise, metal coloring, metal spacing, metal width definition, metal direction, pin names, delta voltages ($\Delta V$), and/or any other current or voltage characteristics associated with a simulation of training a cell design. The dataset 116 may be any data, programs, functions, and/or the like that may be received by the processing system 106. The dataset 116 may be received by the processing system 106 via a communications network, e.g., an Internet, an intranet, an extranet, a local area network ("LAN"), a wide area network ("WAN"), a metropolitan area network ("MAN"), a virtual local area network ("VLAN"), and/or any other network. The dataset 116 may be received via a wireless, a wired, and/or any other type of connection. Once trained, machine learning component(s) 110 can receive cell layout design constraint(s) 118 for designing of a cell layout 120. Cell layout design constraints 118 can be any constraints required to achieve specific operational capabilities with a cell layout. With knowledge of dataset 116 and cell layout design constraints 118, machine learning component(s) 110 generates an optimized cell layout 120.

Processing systems 104, 106 may be implemented using software, hardware and/or any combination of both. Processing systems 104, 106 may also be implemented in a personal computer, a laptop, a server, a mobile telephone, a smartphone, a tablet, and/or any other type of device and/or any combination of devices. The machine learning component(s) 110 may perform execution, compilation, and/or any other functions on the received dataset 116 as well as machine learning functions, as discussed in further detail below. Processing system 106 also includes a data storage component 112. The data storage component 112 may be used for storage of data processed by processing system 106 and may include any type of memory (e.g., a temporary memory, a permanent memory, and/or the like). In some embodiments, simulation module 108, machine learning component 110, and/or data storage component 112 can be on a single processing system or spread amongst any number of processing systems and are not limited to the two processing systems illustrated in FIG. 1.

Figure 2:
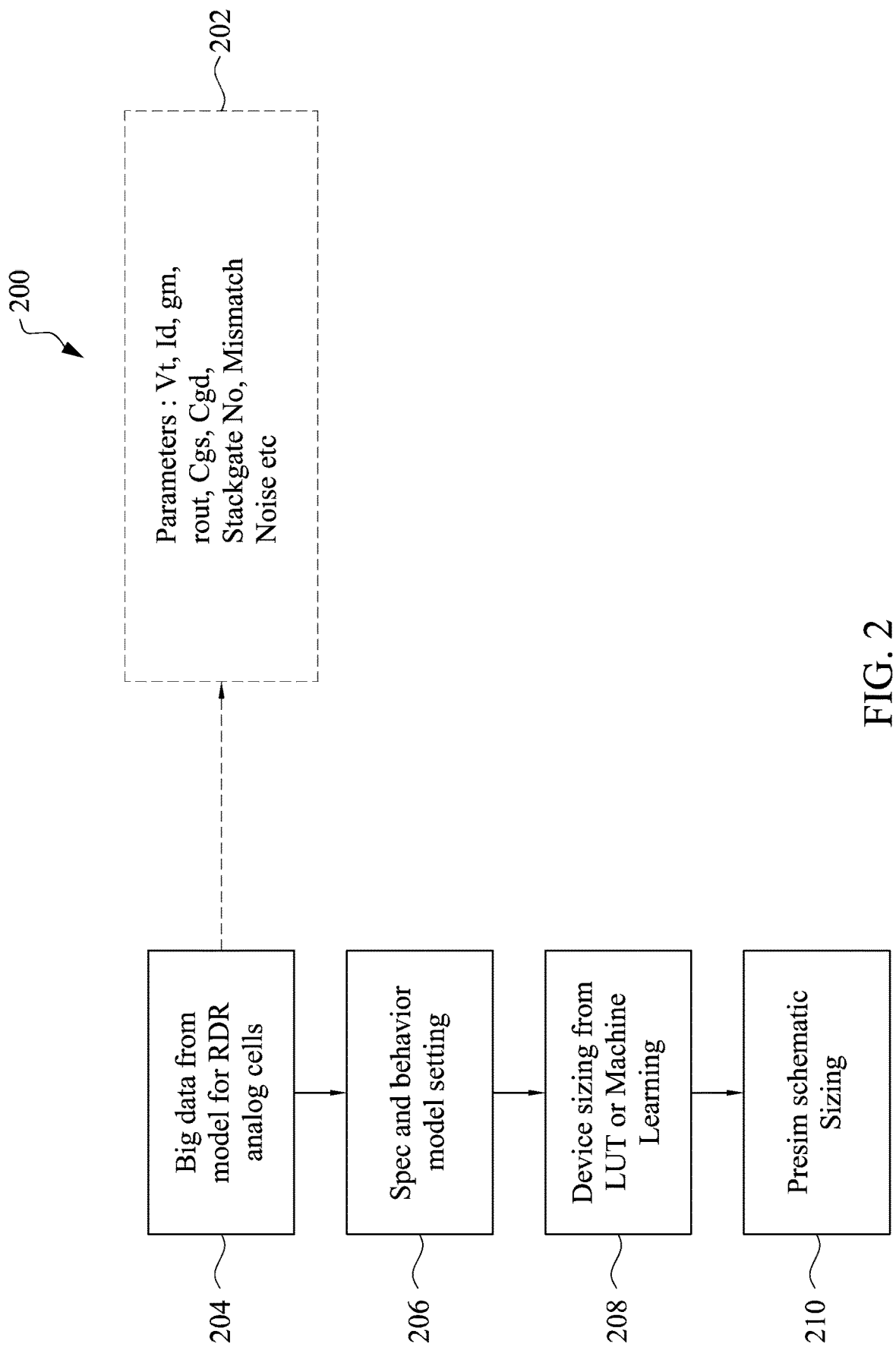
FIG. 2 is a flow chart of an exemplary method of using machine learning for pre-characterization design in accordance with various embodiments of the present disclosure.

FIG. 2 is a flow chart 200 of an exemplary method of using machine learning for pre-characterization design in accordance with various embodiments of the present disclosure. Simulations are run with a number of cells to simulate electrical performance of those cells. Key electrical parameters 202 are extracted from the simulations to generate a look-up table (LUT) (e.g., dataset 116). In other words, big data (e.g., extremely large datasets) are generated, at 204, from a series of electrical cells (e.g., analog cells such as restrictive design rules (RDR) analog cells). Electrical parameters 202 can include $V_t$, $I_d$, $g_m$, $r_{out}$, $C_{gs}$, $C_{gd}$, stackgate number, mismatch, and/or noise. Cell layout design constraints 118 can include specification and/or behavioral model settings 206 such as nominal device operating temperatures, environmental operation conditions, input voltages, and/or operational current ranges, etc. Depending upon the desired cell layout, these cell layout design constraints 118 can differ. Machine learning component(s) 110 can be trained using electrical parameters 202. Either a machine learning model or a LUT can provide, at 208, pre-simulated schematic sizing 210 of a cell layout. In other words, the cell layout generated by the machine learning component(s) 110 has not yet been used in a simulation (e.g., electrical performance within the cell layout design constraints 118 has not yet been characterized).

Figure 3A:
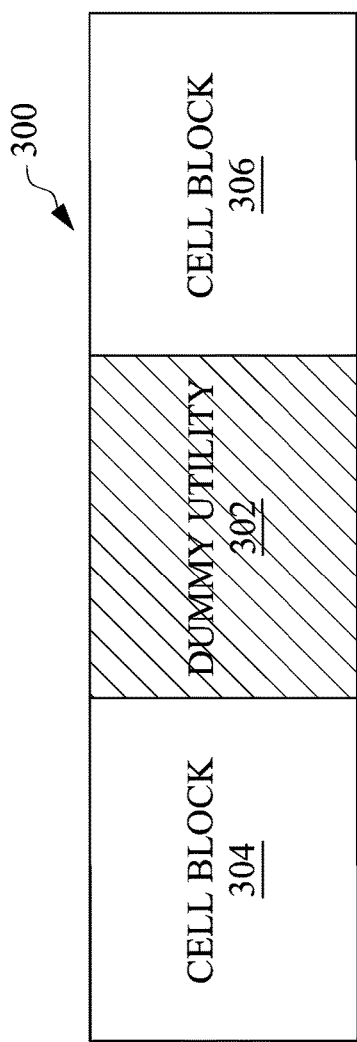
FIG. 3A illustrates an exemplary cell layout having a horizontal abutment between cell blocks and a dummy utility in accordance with various embodiments of the present disclosure.
Figure 3B:
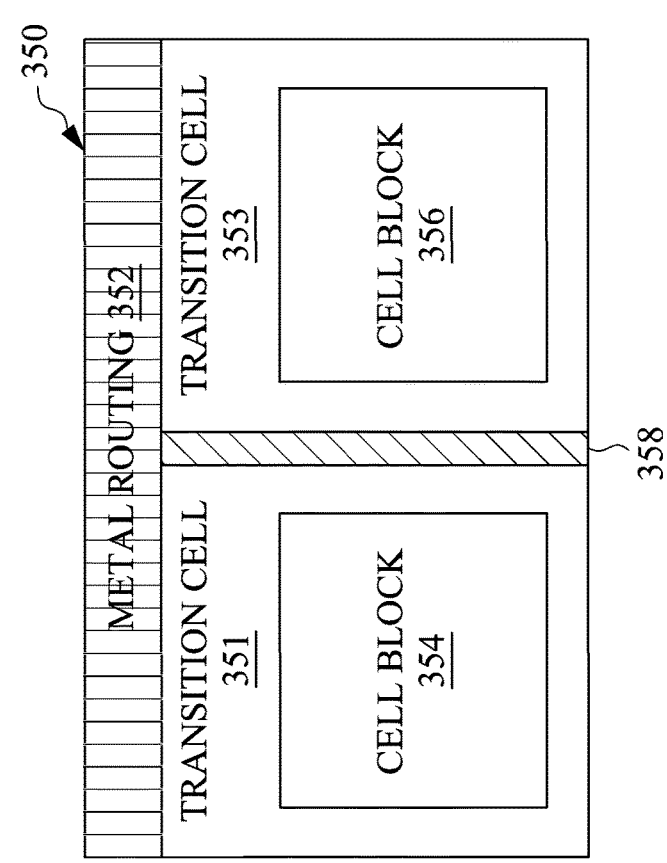
FIG. 3B illustrates an example cell layout generated using machine learning component(s) in accordance with various embodiments of the present disclosure.

Cell layout 120 can include transition cells that replace dummy utilities within traditional cell designs. For example, FIG. 3A illustrates an exemplary cell layout 300 having a horizontal abutment between cell blocks 304, 306 and a dummy utility 302 in accordance with various embodiments of the present disclosure. Cell layout 300 includes a dummy utility 302 positioned horizontally between two cell blocks 304, 306. In this example, cell block 304 can have a gate length ($L_g$) of approximately 3 nanometers and cell block 306 can have an $L_g$ of approximately 54 nanometers. Using machine learning component(s) 110, a cell layout can be generated having transition cells that decreases the width of dummy utility 302. For example, FIG. 3B illustrates an example cell layout 350 generated using machine learning component(s) 110 in accordance with various embodiments of the present disclosure. Transition cells surround each cell block (e.g., transition cell 351 surrounds cell block 354 and transition cell 353 surrounds cell block 356) to decrease the width of a dummy utility 358 horizontally positioned between the cell blocks 354, 356. In this example, cell block 354 can have a gate length ($L_g$) of approximately 3 nanometers and cell block 356 can have an $L_g$ of approximately 54 nanometers. With cell layout 350, the width of dummy utility 302 is reduced to a smaller width (e.g., the width of dummy utility 358 is less than about 100 nanometers). The dummy utility 302 being small also eliminates the need for design rule checking (DRC). Additionally, metal routing 352 can be placed on top of transition cells 351, 353.

Transitional cells can also be used in a vertical abutment cell block formation. For example, FIG. 4A illustrates an exemplary cell layout 400 having a vertical abutment between cell blocks 404, 406 and a dummy utility 402 in accordance with various embodiments of the present disclosure. Cell layout 400 includes a dummy utility 402 positioned vertically between two cell blocks 404, 406. In this example, cell block 404 can have a gate length ($L_g$) of approximately 3 nanometers and cell block 406 can have an $L_g$ of approximately 54 nanometers. Using machine learning component(s) 110, a cell layout can be generated having transition cells that decrease the width of dummy utility 402. For example, FIG. 4B illustrates an example cell layout 450 generated using machine learning component(s) 110 in accordance with various embodiments of the present disclosure. Transition cells surround each cell block (e.g., transition cell 451 surrounds cell block 454 and transition cell 453 surrounds cell block 456) to decrease the width of a dummy utility 458 vertically positioned between the cell blocks 454, 456. In this example, cell block 454 can have a gate length ($L_g$) of approximately 3 nanometers and cell block 456 can have an $L_g$ of approximately 54 nanometers. With cell layout 450, the width of dummy utility 402 is reduced to a smaller width (e.g., the width of dummy utility 458 is less than about 100 nanometers). The dummy utility 402 being small also eliminates the need for DRC. Additionally, metal routing 452 can be placed on top of transition cell 451.

Figure 5A:
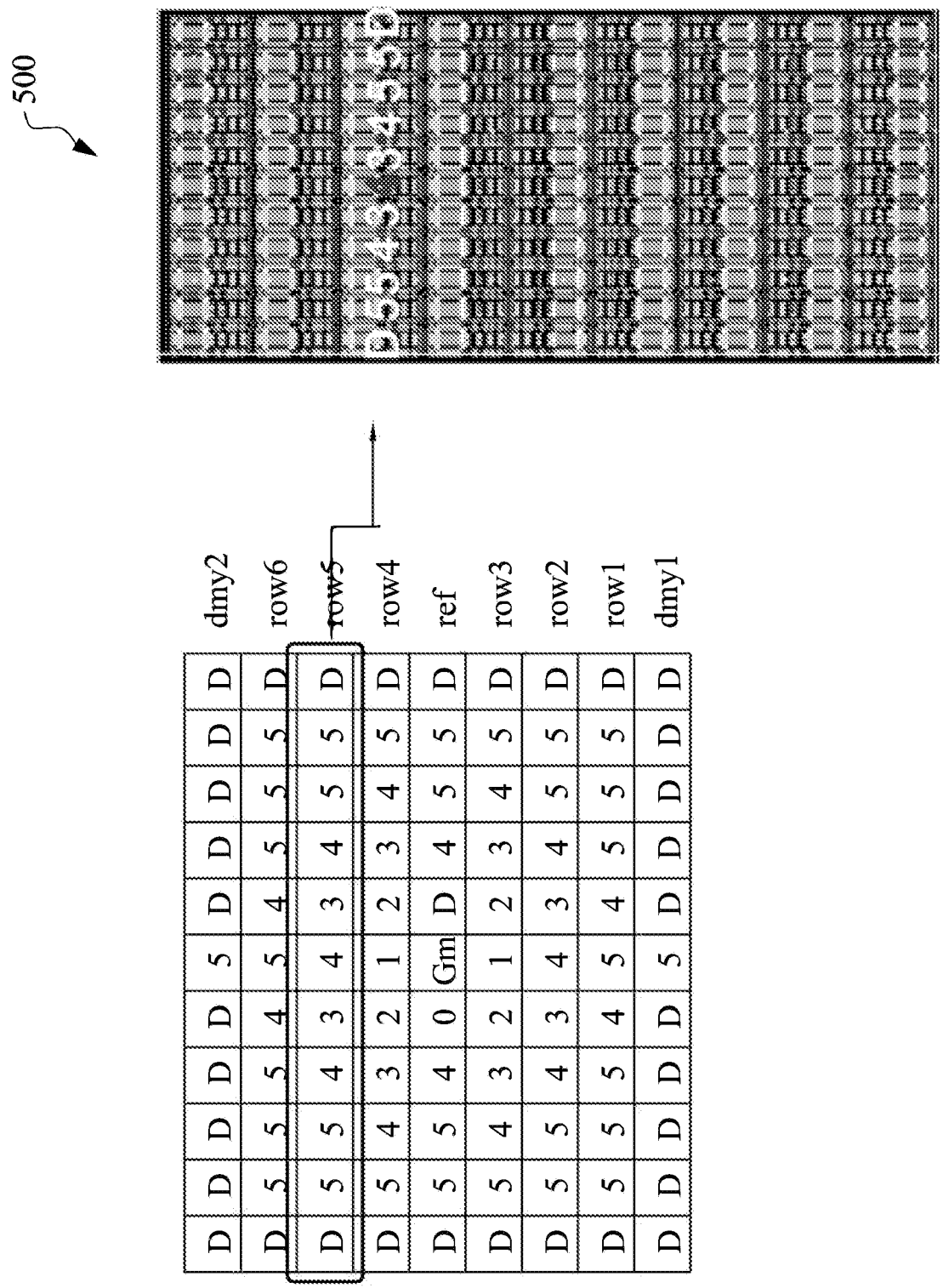
FIG. 5A illustrates an exemplary top cell layout design in accordance with various embodiments of the present disclosure.
Figure 5B:
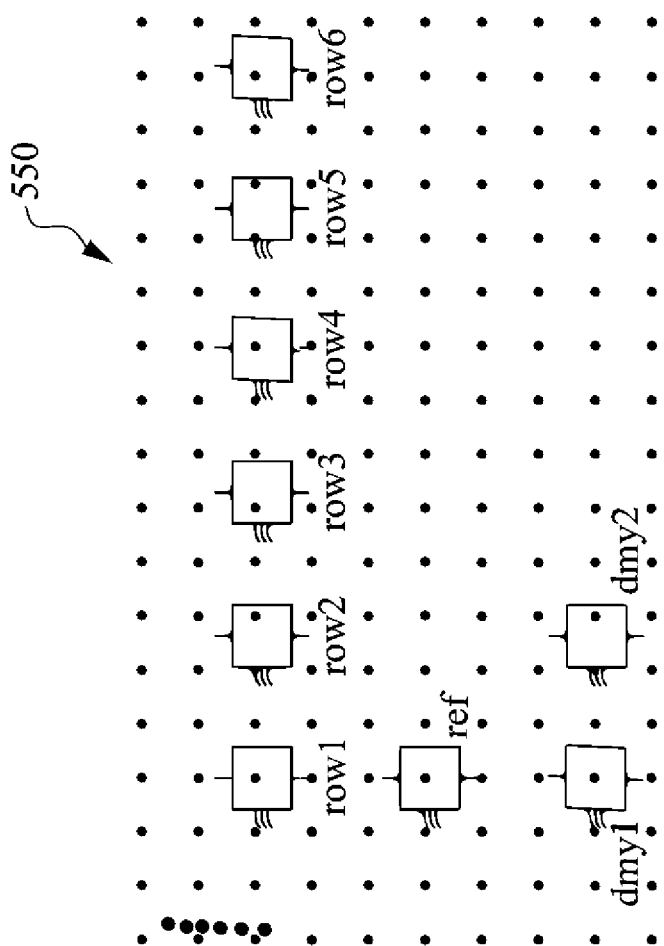
FIG. 5B illustrates an exemplary electrical schematic generated using the exemplary top cell layout design of FIG. 5A in accordance with various embodiments of the present disclosure.

In accordance with some embodiments, training cell design(s) 114 can include a number of cell designs generated using programmable placement. For example, programmable coding can be used to build a top cell layout design 500 as illustrated in FIG. 5A in accordance with various embodiments of the present disclosure. Such programmable coding can have a setting file which defines various layout rules. Various coding scripts (e.g., python scripts or any other coding script) can generate various cell placement within top cell layout design 500. FIG. 5B illustrates an exemplary electrical schematic 550 generated using the top cell layout design 500 of FIG. 5A in accordance with various embodiments of the present disclosure. Both the top cell layout design 500 and electrical schematic 550 can be provided to simulation module 108 as training cell design(s) 114 for simulated operations and ultimately utilized to train machine learning component(s) 110.

Figure 6:
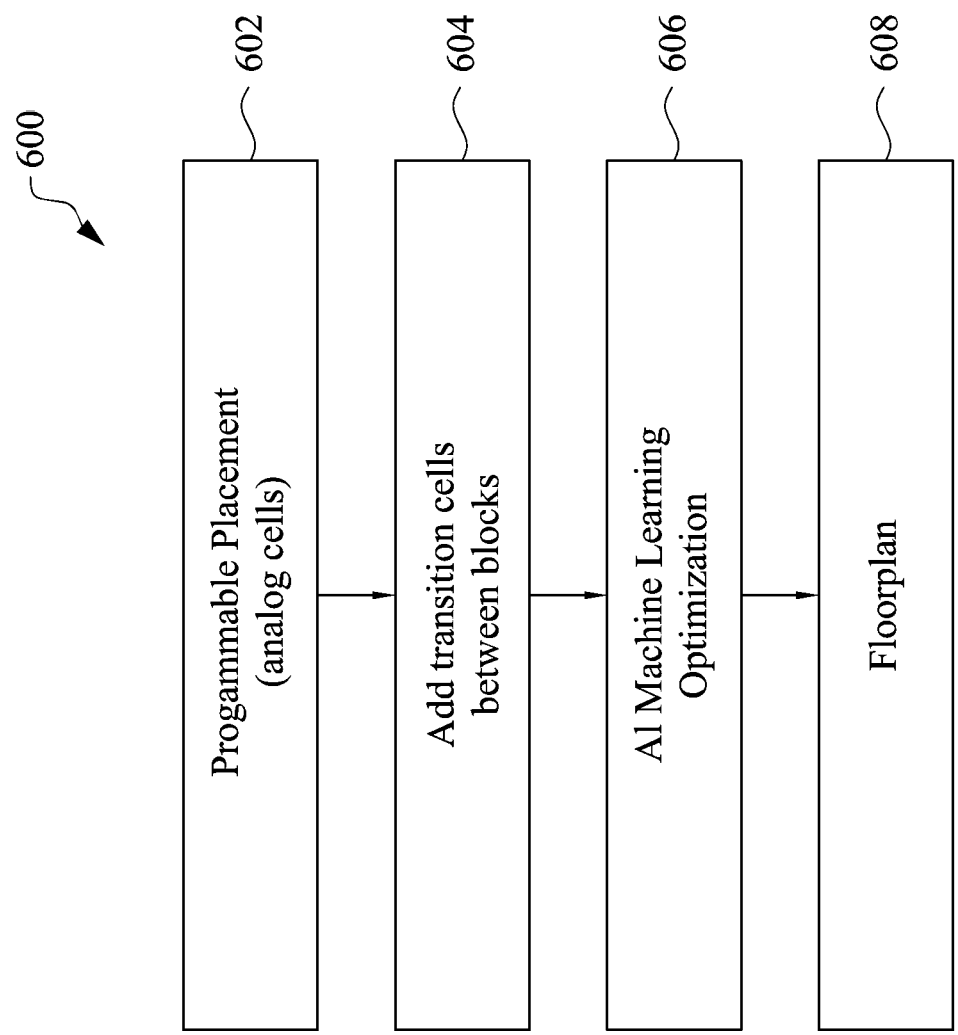
FIG. 6 is a flow chart of an exemplary method of using machine learning for cell placement in accordance with various embodiments of the present disclosure.

FIG. 6 is a flow chart 600 of an exemplary method of using machine learning for cell placement. Top cell layout designs and electrical schematics using programmable placement, as described in FIGS. 5A-5B, are used, at 602, to train machine learning component(s) 110. The machine learning component(s) 110 can add, at 604, transition cells to replace dummy utilities, as described in FIGS. 3A-4B. The machine learning component(s) 110 can also optimize, at 606, the cell layout to generate a floorplan 608 (e.g., cell layout 120).

Figure 7:
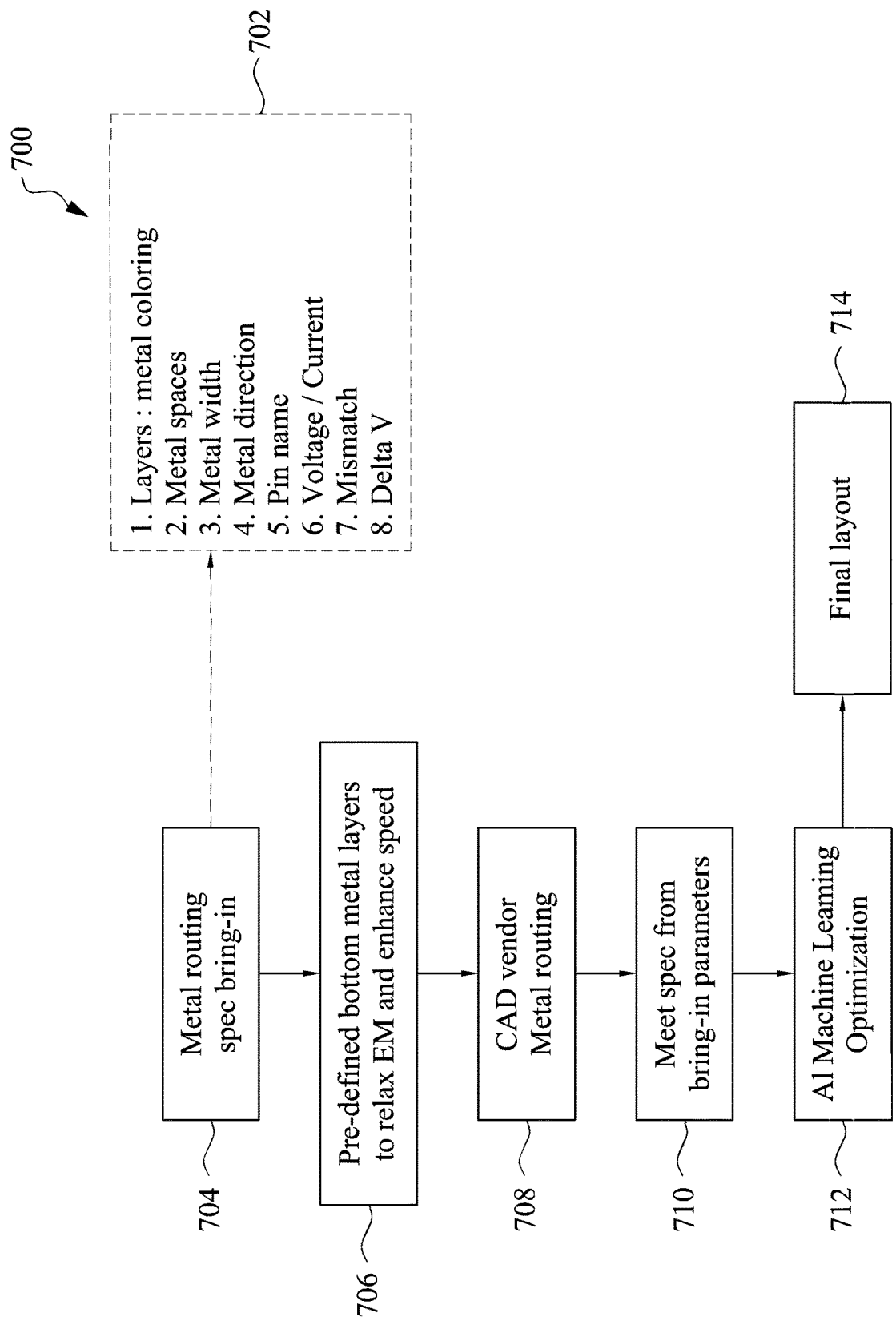
FIG. 7 is a flow chart of an exemplary method of using machine learning for metal routing in accordance with various embodiments of the present disclosure.

Cell layout 120 can also include optimized metal routing. For example, FIG. 7 is a flow chart 700 of an exemplary method of using machine learning for metal routing in accordance with various embodiments of the present disclosure. A number of cell design constraints 118 are collected which include metal routing specifications 704 along with pre-defined bottom metal layers 706 and computer-aided design (CAD) metal routing drawings 708. These cell design constraints 118 can be provided to machine learning component(s) 110 in order to meet the specified design constraints, at 710. Dataset 116 can include a number of electrical parameters 702 such as metal coloring, metal spacing, metal width definition, metal direction, pin names, voltage characteristics, current characteristics, and/or delta voltages ($\Delta V$). After being trained with dataset 116, machine learning component(s) 110 can be used to optimize, at 712, metal routing within the final layout 714 (e.g., cell layout 120). The metal routing generated by machine learning component(s) 110 can include an identified critical pathway for signal routing within the cell layout 120.

Figure 8:
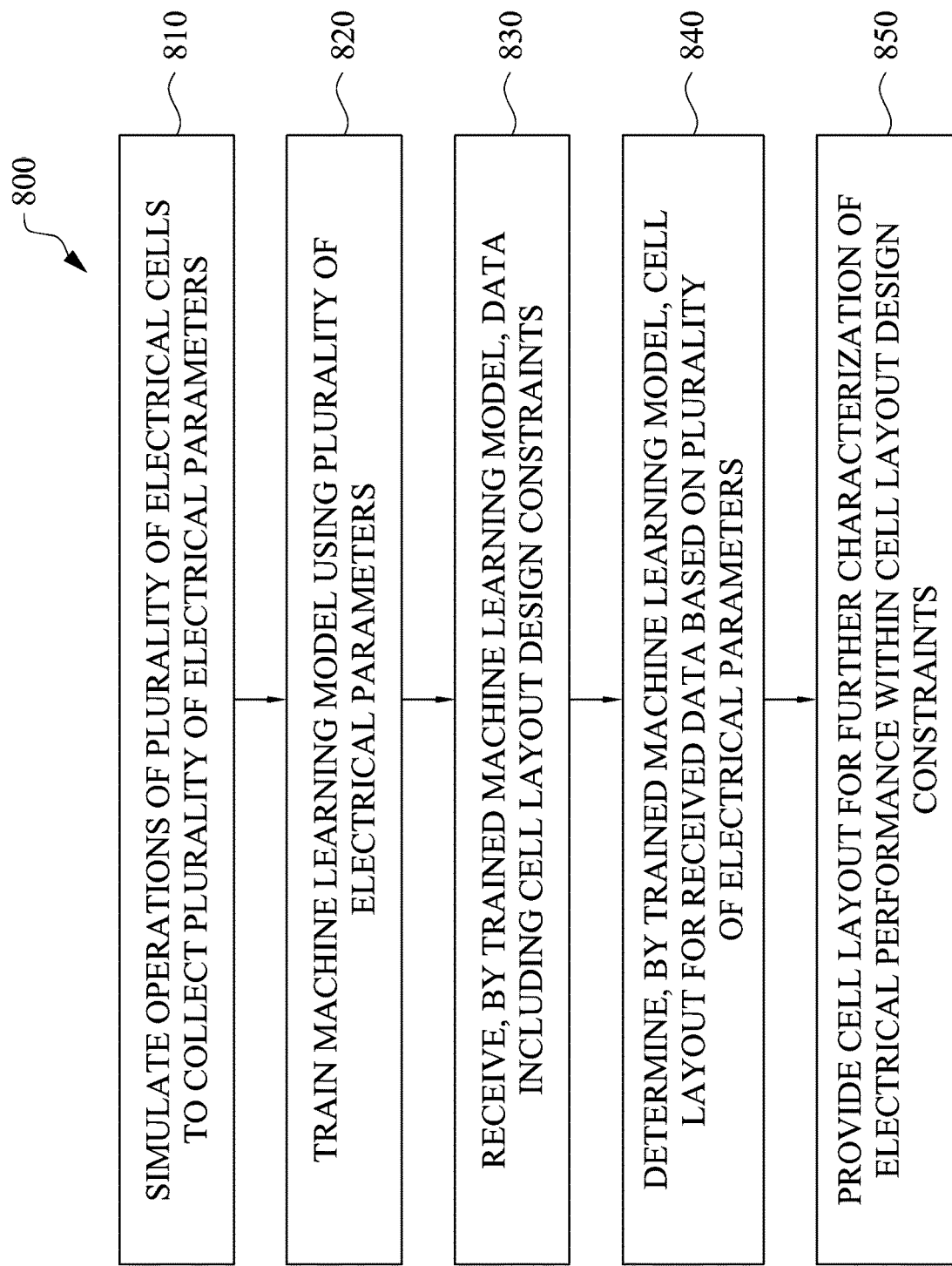
FIG. 8 is a flow chart of an exemplary method of pre-characterization of analog cells in accordance with various embodiments of the present disclosure.

FIG. 8 is a flow chart 800 of an exemplary method of pre-characterization of analog cells in accordance with various embodiments of the present disclosure. The method is applicable to a wide variety of underlying structures. But for ease of understanding, the steps of FIG. 8 are described with reference to structures depicted in FIGS. 1-7. Operations of a plurality of electrical cells are simulated, at 810, to collect a plurality of electrical parameters. A machine learning model is trained, at 820, using the plurality of electrical parameters. The trained machine learning model receives, at 830, data that includes cell layout design constraints. The trained machine learning model determines, at 840, a cell layout for the received data based on the plurality of electrical parameters. The cell layout is provided, at 850, for further characterization of electrical performance within the cell layout design constraints (e.g., characterizing whether the cell layout operationally performs within the cell design constraints).

FIG. 9 is a flow chart 900 of an exemplary method of using a machine learning model to generate analog cell layouts in accordance with various embodiments of the present disclosure. The method is applicable to a wide variety of underlying structures. But for ease of understanding, the steps of FIG. 9 are described with reference to structures depicted in FIGS. 1-7. A trained machine learning model receives, at 910, data including cell layout design constraints. The trained machine learning model is trained using a plurality of electrical parameters collected by one or more simulated operations of a plurality of electrical cells. The trained machine learning model determines, at 920, a cell layout for the received data based on the plurality of electrical parameters. The cell layout is provided, at 930, for further characterization of electrical performance within the cell layout design constraints.

FIG. 10 is a flow chart 1000 of an exemplary method of training a machine learning model to generate analog cell layouts in accordance with various embodiments of the present disclosure. The method is applicable to a wide variety of underlying structures. But for ease of understanding, the steps of FIG. 10 are described with reference to structures depicted in FIGS. 1-7. Operations of a plurality of electrical cells are simulated, at 1010, to collect a plurality of electrical parameters. A machine learning model is trained, at 1020, using the plurality of electrical parameters. The trained machine learning model is used to generate a cell layout based on the plurality of the electrical parameters and cell layout design constraints.

Figure 11:
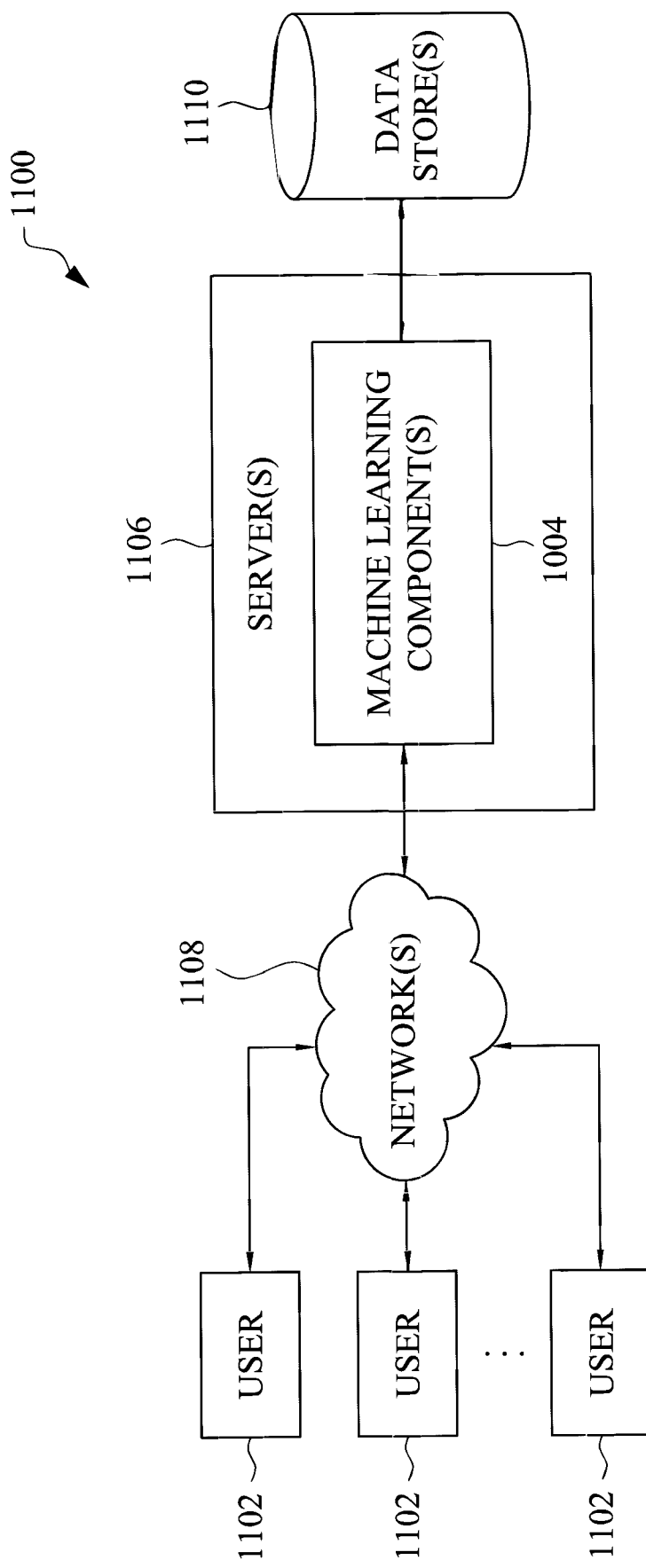
FIG. 11 illustrates an example computer-implemented environment for implementing various aspects described herein.

FIG. 11 illustrates an example computer-implemented environment 1100 wherein users 1102 can interact with machine learning component(s) 1104 for determining the various cell layouts as described herein, hosted on one or more servers 1106 through a network 1108. The machine learning component(s) 1104 can assist the users 1102 with interfacing between an object-oriented modeling language based interface and a hardware description language based interface.

As shown in FIG. 11, the users 1102 can interact with the machine learning component(s) 1104 through a number of ways, such as over one or more networks 1108. One or more servers 1106 accessible through the network(s) 1108 can host the machine learning component(s) 1104. The one or more servers 1106 can also contain or have access to one or more data stores 1110 for storing data for the machine learning component(s) 1104.

Figure 12:
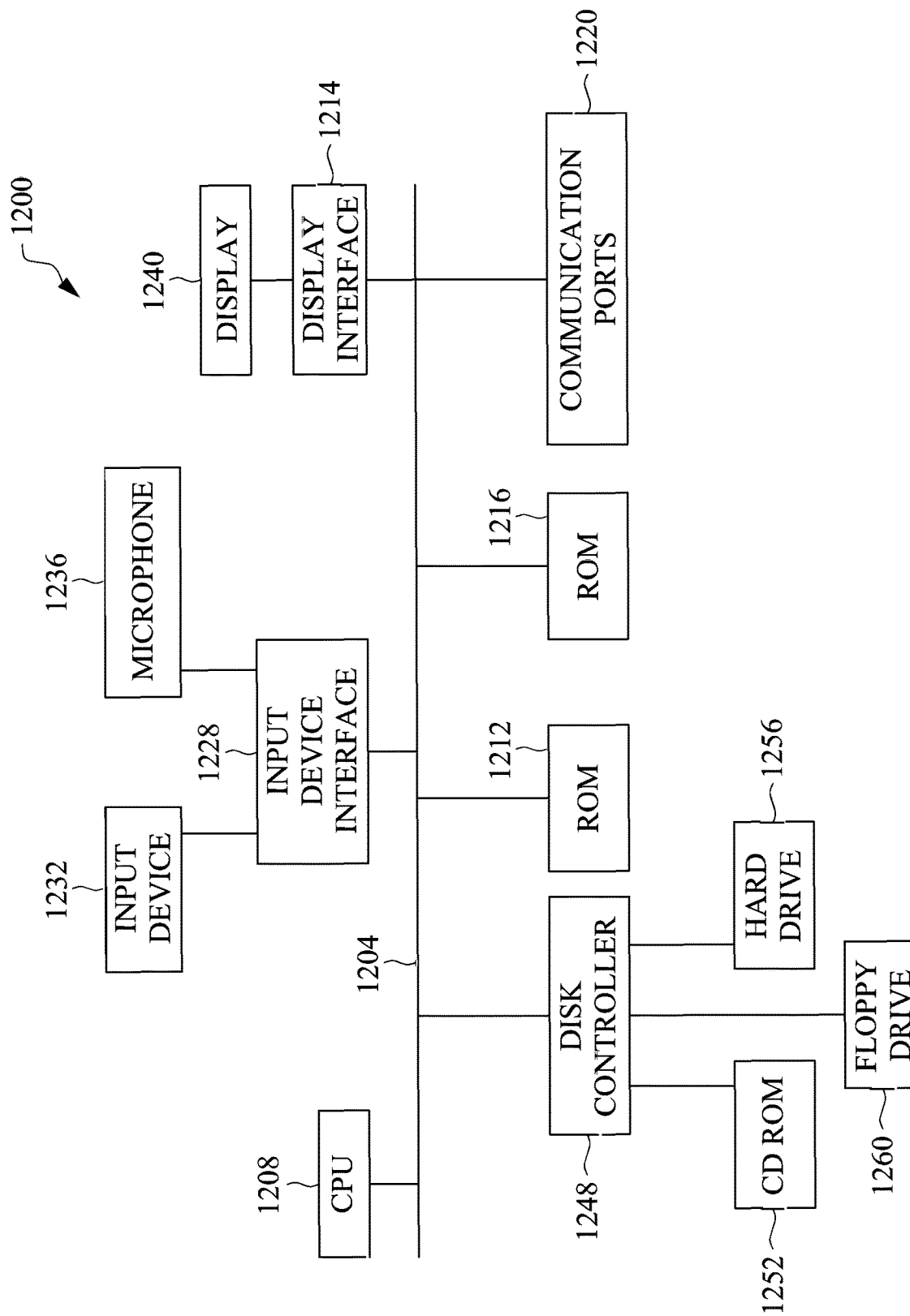
FIG. 12 illustrates an example computing architecture for implementing various aspects described herein.

FIG. 12 is a diagram 1200 illustrating a sample computing device architecture for implementing various aspects described herein. A bus 1204 can serve as the information highway interconnecting the other illustrated components of the hardware. A processing system 1208 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1212 and random access memory (RAM) 1216, can be in communication with the processing system 1208 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1248 can interface one or more optional disk drives to the system bus 1204. These disk drives can be external or internal floppy disk drives such as 1260, external or internal CD-ROM, CD-R, CD-RW or DVD, or solid state drives such as 1252, or external or internal hard drives 1256. As indicated previously, these various disk drives 1252, 1256, 1260 and disk controllers are optional devices. The system bus 1204 can also include at least one communication port 1220 to allow for communication with external devices either physically connected to the computing system or available externally through a wired or wireless network. In some cases, the communication port 1220 includes or otherwise comprises a network interface.

To provide for interaction with a user, the subject matter described herein can be implemented on a computing device having a display device 1240 (e.g., a CRT (cathode ray tube) or LCD (liquid crystal display) monitor) for displaying information obtained from the bus 1204 to the user and an input device 1232 such as keyboard and/or a pointing device (e.g., a mouse or a trackball) and/or a touchscreen by which the user can provide input to the computer. Other kinds of input devices 1232 can be used to provide for interaction with a user as well; for example, feedback provided to the user can be any form of sensory feedback (e.g., visual feedback, auditory feedback by way of a microphone 1236, or tactile feedback); and input from the user can be received in any form, including acoustic, speech, or tactile input. In the input device 1232 and the microphone 1236 can be coupled to and convey information via the bus 1204 by way of an input device interface 1228. Other computing devices, such as dedicated servers, can omit one or more of the display 1240 and display interface 1214, the input device 1232, the microphone 1236, and input device interface 1228.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Use of the various methods and configurations as described herein can provide a number of advantages. For example, the cell design generated by the trained machine learning model can provide an integrated mixed-signal design infrastructure that optimizes cell placement and signal routing. Productivity of cell design is enhanced as numerous trial-and-error design stages are eliminated. Additionally, a silicon-to-silicon (S2S) gap within a device is reduced using the cell layouts generated by the trained machine learning model. Use of a cell layout generated by the machine learning component can also optimize a cell's power performance area (PPA).

In one embodiment, operations of a plurality of electrical cells are simulated to collect a plurality of electrical parameters. A machine learning model is trained using the plurality of electrical parameters. The trained machine learning model receives data having cell layout design constraints. The trained machine learning model determines a cell layout for the received data based on the plurality of electrical parameters. The cell layout is provided for further characterization of electrical performance within the cell layout design constraints.

In another embodiment, a trained machine learning model receives data including cell layout design constraints. The trained machine learning model is trained using a plurality of electrical parameters collected by one or more simulated operations of a plurality of electrical cells. The trained machine learning model determines a cell layout for the received data based on the plurality of electrical parameters. The cell layout is provided for further characterization of electrical performance within the cell layout design constraints.

In yet another embodiment, operations of a plurality of electrical cells are simulated to collect a plurality of electrical parameters. A machine learning model is trained using the plurality of electrical parameters, wherein the trained machine learning model is used to generate a cell layout based on the plurality of the electrical parameters and cell layout design constraints.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method comprising:
training a machine learning model using a plurality of electrical parameters associated with a plurality of electrical cells;
receiving, by the trained machine learning model, data comprising cell layout design constraints;
determining, by the trained machine learning model, a cell layout for the received data based on the plurality of electrical parameters by:
positioning at least two electrical cells of the plurality of electrical cells within the cell layout; and
generating at least two transition cells surrounding the at least two electrical cells, each transition cell surrounding an electrical cell; and
providing the cell layout for further characterization of electrical performance within the cell layout design constraints.

2. The computer-implemented method of claim 1, further comprising:
simulating, at a first time, operations of a first electrical cell under a first set of operational conditions to determine a first set of electrical parameters; and
simulating, at a second time, operations of a second electrical cell under a second set of operational conditions to determine a second set of electrical parameters,
wherein the plurality of electrical cells comprise the first electrical cell and the second electrical cell and the plurality of electrical parameters comprise the first set of electrical parameters and the second set of electrical parameters.

3. The computer-implemented method of claim 1, further comprising simultaneously simulating operations of the plurality of electrical cells.

4. The computer-implemented method of claim 1, wherein the cell layout comprises metal routing of one or more metal lines and the plurality of electrical parameters comprise at least one of: metal spacing, metal width, metal direction, a pin name, a voltage, a current, a mismatch, or a delta voltage.

5. The computer-implemented method of claim 1, wherein the cell layout is an analog cell layout.

6. The computer-implemented method of claim 1, wherein an empty region exists between the at least two transition cells.

7. The computer-implemented method of claim 6, wherein the at least two transition cells are positioned horizontally with respect to each other.

8. The computer-implemented method of claim 6, wherein the at least two transition cells are positioned vertically with respect to each other.

9. The computer-implemented method of claim 6, wherein the empty region comprises a width less than about 100 nanometers.

10. The computer-implemented method of claim 6, further comprising generating metal routing on top of the at least two transition cells.

11. A system comprising:
a data processor; and
a memory encoded with instructions for commanding the data processor to perform operations comprising:
determining, by a trained machine learning model, a cell layout for data comprising cell layout design constraints based on a plurality of electrical parameters by:
positioning at least two electrical cells of a plurality of electrical cells within the cell layout; and
generating at least two transition cells surrounding the at least two electrical cells, each transition cell surrounding an electrical cell; and
providing the cell layout for further characterization of electrical performance within the cell layout design constraints.

12. The system of claim 11, wherein the operations further comprise:
simulating, at a first time, operations of a first electrical cell under a first set of operational conditions to determine a first set of electrical parameters; and
simulating, at a second time, operations of a second electrical cell under a second set of operational conditions to determine a second set of electrical parameters,
wherein the plurality of electrical cells comprise the first electrical cell and the second electrical cell and the plurality of electrical parameters comprise the first set of electrical parameters and the second set of electrical parameters.

13. The system of claim 11, wherein the operations further comprise simultaneously simulating operations of the plurality of electrical cells.

14. The system of claim 11, wherein the cell layout comprises metal routing of one or more metal lines and the plurality of electrical parameters comprise at least one of: metal spacing, metal width, metal direction, a pin name, a voltage, a current, a mismatch, or a delta voltage.

15. The system of claim 11, wherein the cell layout is an analog cell layout.

16. The system of claim 11, wherein the operations further comprise:
generating metal routing on top of the at least two transition cells, wherein an empty region exists between the at least two transition cells.

17. The system of claim 16, wherein the at least two transition cells are positioned horizontally with respect to each other.

18. The system of claim 16, wherein the at least two transition cells are positioned vertically with respect to each other.

19. The system of claim 16, wherein the empty region comprises a width less than about 100 nanometers.

20. A non-transitory processor-readable storage medium storing programming instructions, which when executed by at least one data processor result in operations comprising:
training a machine learning model using a plurality of electrical parameters associated with a plurality of electrical cells, wherein the trained machine learning model is used to generate a cell layout based on the plurality of the electrical parameters and cell layout design constraints, wherein the cell layout is generated by:
positioning at least two electrical cells of the plurality of electrical cells within the cell layout; and
generating at least two transition cells surrounding the at least two electrical cells, each transition cell surrounding an electrical cell.

* * * * *